(12) United States Patent
Bedford

(10) Patent No.: US 6,976,710 B1
(45) Date of Patent: Dec. 20, 2005

(54) METHOD AND DEVICE FOR REPAIR AND REPLACEMENT OF PIPE BROKEN AT A JUNCTION

(76) Inventor: William D. Bedford, 14319 Briarbend, San Antonio, TX (US) 78247

(*) Notice: Subject to any disclaimer, the term of this patent is extended or adjusted under 35 U.S.C. 154(b) by 0 days.

(21) Appl. No.: 10/347,808

(22) Filed: Jan. 21, 2003

(51) Int. Cl.$^7$ .............................................. F16L 55/18
(52) U.S. Cl. ........................... 285/15; 285/12; 285/16; 285/17; 285/31; 285/181; 138/97; 403/11; 29/402.08
(58) Field of Search .............................. 285/15, 16, 17, 285/117, 179, 181, 12, 31; 403/11; 425/11, 425/14; 29/402.08, 402.09, 402.12, 402.14; 138/97

(56) References Cited

U.S. PATENT DOCUMENTS

| | | | | |
|---|---|---|---|---|
| 658,313 A | * | 9/1900 | Bernardi | 403/300 |
| 666,316 A | * | 1/1901 | Kenneally | 285/31 |
| 796,781 A | * | 8/1905 | Welsh | 138/97 |
| 2,232,135 A | * | 2/1941 | Pate | 285/16 |
| 2,823,049 A | * | 2/1958 | Hombach | 285/31 |
| 3,971,574 A | * | 7/1976 | Curtin | 285/31 |
| 3,976,314 A | * | 8/1976 | Graham | 285/238 |
| 4,013,309 A | * | 3/1977 | Quick | 285/31 |
| 4,038,737 A | * | 8/1977 | Bretone, Jr. | 29/890.14 |
| 4,235,259 A | * | 11/1980 | Hudock | 138/97 |
| 4,260,181 A | * | 4/1981 | Curtin | 285/15 |
| 4,303,261 A | * | 12/1981 | Reddy | 285/31 |
| 4,461,498 A | * | 7/1984 | Kunsman | 285/16 |
| 4,521,037 A | * | 6/1985 | Knox | 285/15 |
| 4,676,528 A | * | 6/1987 | Gray | 285/15 |
| 4,858,958 A | * | 8/1989 | Harbeke | 285/31 |
| 4,954,016 A | * | 9/1990 | Storgard | 405/184 |
| 5,007,666 A | * | 4/1991 | Kyfes | 285/373 |
| 5,028,078 A | * | 7/1991 | Schwarz et al. | 285/12 |
| 5,040,729 A | * | 8/1991 | Carrozza | 239/201 |
| 5,183,298 A | * | 2/1993 | Harrington | 285/12 |
| 5,257,826 A | * | 11/1993 | Prassas et al. | 285/148.19 |
| 5,499,882 A | * | 3/1996 | Waterhouse | 403/171 |
| 5,778,935 A | * | 7/1998 | Koch | 138/97 |
| 6,595,554 B2 | * | 7/2003 | Byrnes | 285/179 |

* cited by examiner

Primary Examiner—James M. Hewitt
(74) Attorney, Agent, or Firm—Jackson Walker, LLP

(57) ABSTRACT

A method and device for repair and replacement of pipe broken at a junction. The device includes a coupler having a female end and a male end. The female end of the coupler has an inside diameter that will accept snugly the removed end of the broken pipe. The male end has an outside diameter that will snuggly fit into a new junction. The method and device is normally used with PVC pipe. When PVC pipe entering a junction is broken near the junction, the junction may be removed by cutting back from the broken PVC pipe and cutting the remaining pipe where it enters the junction. A new junction can be replaced with the coupler inlapping the new junction and overlapping the pipe.

10 Claims, 6 Drawing Sheets

METHOD AND DEVICE FOR REPAIR AND REPLACEMENT OF PIPE BROKEN AT A JUNCTION

FIELD OF THE INVENTION

Joinder of plastic pipes, more particularly, joinder of pipe using a sleeve having a male end and a female end.

BACKGROUND OF THE INVENTION

Plastic pipes are extensively used in sprinkler systems. They are fairly low cost and they are easy to connect and repair. Such pipes are often called PVC pipes because they are made from a poly vinyl chloride composition. They may be joined without threading, for example by applying adhesive such as pipe solvent to the end of the pipes and slipping the pipes together.

Applicant's invention relates to pipe, such as PVC pipe which is often buried underground. For example, underground PVC pipe is often used in lawn sprinkler systems to deliver water to the lawn. Where these pipes, are connected, such as at a "junction," forces are sometimes concentrated. Occasionally, this causes fracturing in the pipes, typically adjacent to such a junction.

When a break occurs in an underground sprinkler system having PVC pipe it can be repaired by digging away dirt over the break, cutting out a small section of pipe containing the break and connecting a new section of pipe using a pair of couplings, one coupling at each junction of the new section of pipe and the old pipe. However, this operation often requires removing dirt from around a long section of pipe, which may be inconvenient especially when it's pipe in a lawn sprinkler system. A repair method and device which would allow the installation of a new junction where the break occurs in a pipe adjacent the entry of the pipe to the junction, without requiring large amounts of dirt being removed from around the break area would facilitate repairs of a sprinkler system.

While a number of patents are directed to a sleeve for joining two pipe sections having the same outer diameter, Applicant's method and sleeve is directed to providing a new junction (such as a T junction, cross or an elbow) and a device to join the extension to the pipe entering the junction where the break in the pipe entering the junction is adjacent or close to the point where the junction and pipe meet.

Prior art teaches repair of breaks by cutting back, a substantial distance, backup the conduit (see FIG. 1). Then, the prior art teaches, placing a new pipe section, of the same Id (inner diameter) and Od (outer diameter) as the broken pipe, with a suitable external or internal sleeve, to join the two pipe sections. A problem arises when one has to cut back a substantial distance to sleeve the broken pipe. One must provide a sufficient distance for the new replacement pipe to approach the junction. While in many cases this may not present a problem, it does if one is tearing up a lawn to get room to sleeve to the broken pipe. In some situations there is not a lot of space to work and the best solution would be to cut the pipe as close to the broken pipe section as possible. Yet this cannot be achieved in the prior art method where the broken pipe needs to be cut back a sufficient distance to allow a first sleeve to be filled to the broken end, yet to be sufficiently back from the junction piece so as not to interfere with the junction piece joining the new (replaced) section of pipe.

SUMMARY OF THE INVENTION

Applicant provides a novel sleeve with a female end and a male end. The male end has an outer diameter that is about equal to (or slightly smaller than) the inner diameter of the junction. The female end has a inner diameter that is equal to (or slightly larger than) the outer diameter of the pipe. At a pipe break near the junction, applicant's remove the junction by cutting back behind the break of the pipe (and cutting back unbroken pipe coming into the junction) and replacing the "old" junction (with the broken end of the pipe attached) with a new junction of, typically, the same dimensions. Applicant's method then provides for inserting the male end, coated with solvent into the removed ends of the new junctions (using one or more sleeves as necessary to reach the cut back pipe) and inserting, as by bending the pipe into the new sleeves, the ends of the cut back pipe into the female end of the sleeve.

Applicant provides a novel sleeve and a method for replacing a junction that allows one to cut just adjacent the broken area instead of well up the pipe of the broken area to achieve a close snug fit with the new, replaced junction. This is done by fitting the broken pipe with the novel sleeve in the method as set forth herein, and running the sleeve into the new junction instead of into another pipe section.

DETAILED DESCRIPTION OF THE PREFERRED EMBODIMENT

Figure 2:
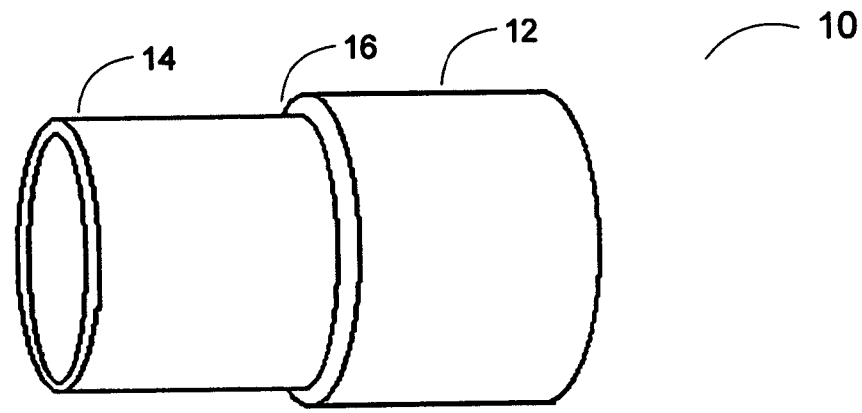
FIG. 2 is a perspective view of Applicant's novel sleeve and method of using the sleeve to replace the broken pipe where the break is near a junction.
Figure 3:
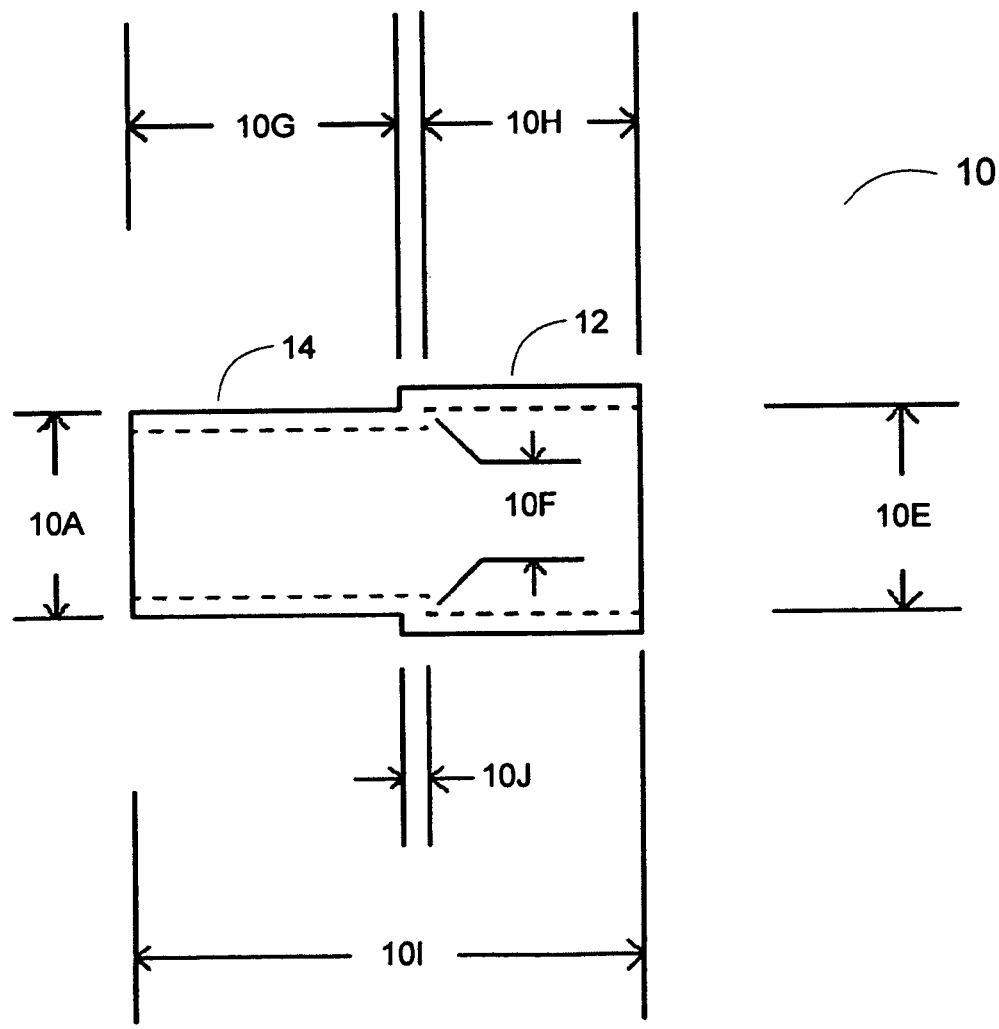
FIG. 3 is a cross-sectional view of Applicant's novel sleeve.

As set forth in FIGS. 2 and 3, the construction of this unique sleeve fitting 10 provides for a female end 12 with an inside diameter 10E to be approximately equal or just slightly larger than the outside diameter of broken pipe "Pb." A male end 14 with outside diameter 10A is provided about equal the I.D. of the new junction J which is to replace the junction removed in the first step of Applicant's replacement procedure.

Figure 1:
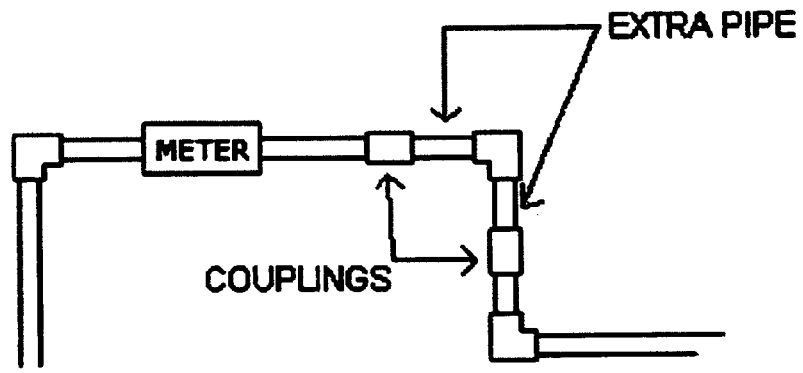
FIG. 1 is an illustration of prior art method of sleeving pipe.
Figure 1A:
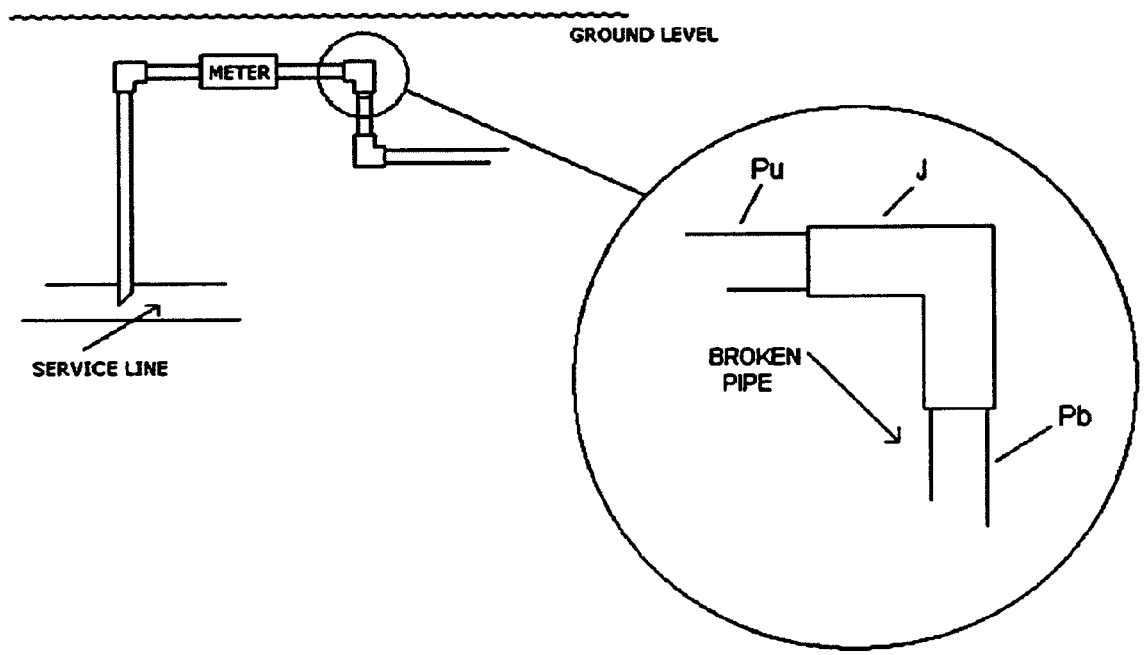
FIG. 1A is an illustration of an unbroken pipe "PU" entering a junction "J" which has broken pipe "Pb," broken adjacent the junction.
Figure 4:
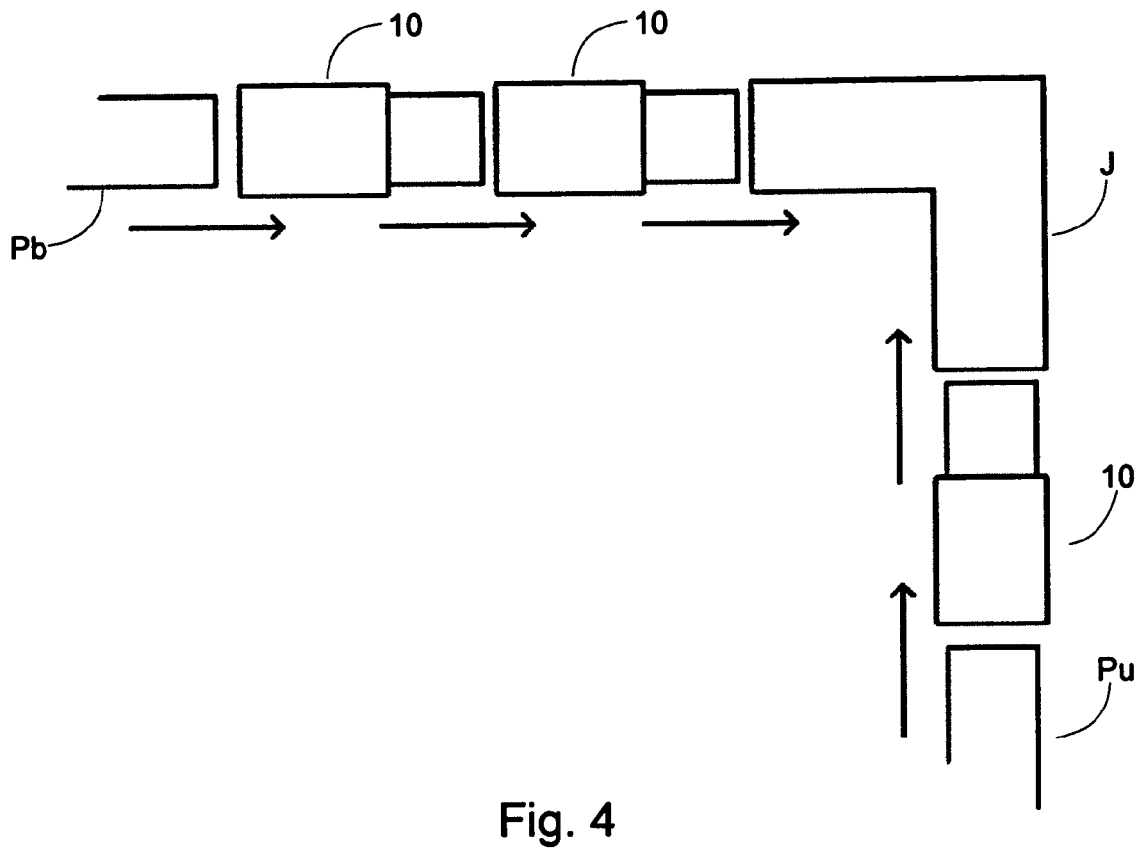
FIG. 4 is an illustration of the use of Applicant's novel sleeve and novel method for replacing a broken pipe and providing a new junction J, where two sleeves are used coming off one end of the new junction and a single sleeve coming off the other end of the new junction (shaded in glued area).

This sleeve 10 and method of installation and use allows one to effect the replacement of a new junction when there is a break as seen in FIG. 1A adjacent to a junction J, without extensive cutting back and without providing a replacement pipe section. Instead, sleeve 10 is run directly from cut back broken pipe Pb as seen in FIG. 4 into a new junction. Typically, the cut back pipe "Pb" is inserted and glued into female end 12 of sleeve, (whose inner walls may be tapered) until it seats. A shoulder 16 is located where the female and male ends meet.

Here it is assumed that, as is typical with Applicant's method, the dimensions of the new junction are the same as the dimensions of the removed junction. With the removal of the old junction each of the two pipes Pb and Pu illustrated in FIG. 4 are cut back, typically the same distance, cut back, that is, from where the pipes entered junction "J." That distance is determined by the proximity of the break to the point where the pipe Pb ("broken pipe") couples into the junction. For example, assume a minimum distance of cut back required to clear the break is equal to 2½ inches, then each of the two pipes may be cut back approximately 2½ inches. Notice that this distance is sufficient to allow Applicant's novel sleeve 10 to slip over the outside diameter of the pipes and yet reach into a new junction, the new junction replacing the old junction. If a greater distance is needed, sleeves can be "stacked" and glued as set forth in FIG. 5A. This method, therefore, requires identifying the cracked site and cutting back that pipe entering the junction a distance required to clear the crack, then cutting the other pipe or pipes that enter that junction, typically, a similar distance. In a preferred embodiment, the broken pipe is cut back a minimum distance required to clear the crack.

It is seen that sleeve 10 has a portion, here female end 12, that overlaps the pipe remaining after the cut back and a portion, here male end 14, that inlaps the new junction. While the cut back portion should preferably be kept to a minimum, there should be at least sufficient distance equal to the thickness of the shoulder of sleeve 10. Likewise, the cut back should leave sufficient distance for overlap on pipe Pb and sufficient inlap on new junction that, when glued, they make an effective tight seal. Typically the minimum overlap and inlap should be about ¾ of the distance from shoulder 10C to the end of the sleeve.

Figure 1B:
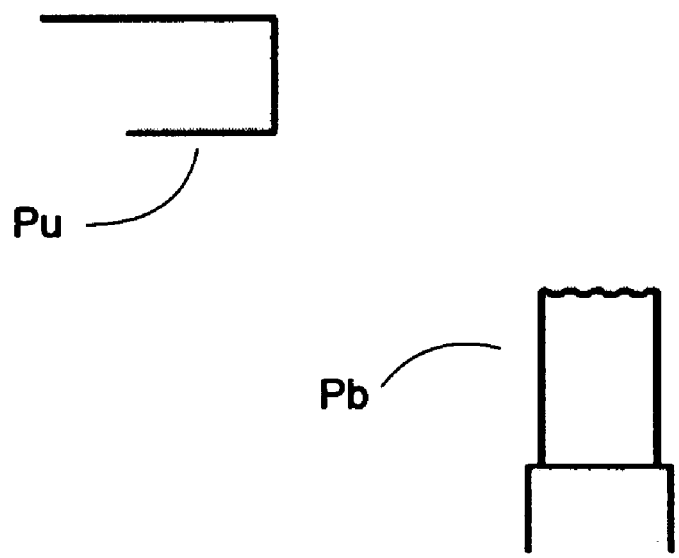
FIGS. 1B, 1C, 1D and 1E illustrate steps in Applicant's novel method of repair and replacement of a pipe broken at a junction.
Figure 1C:
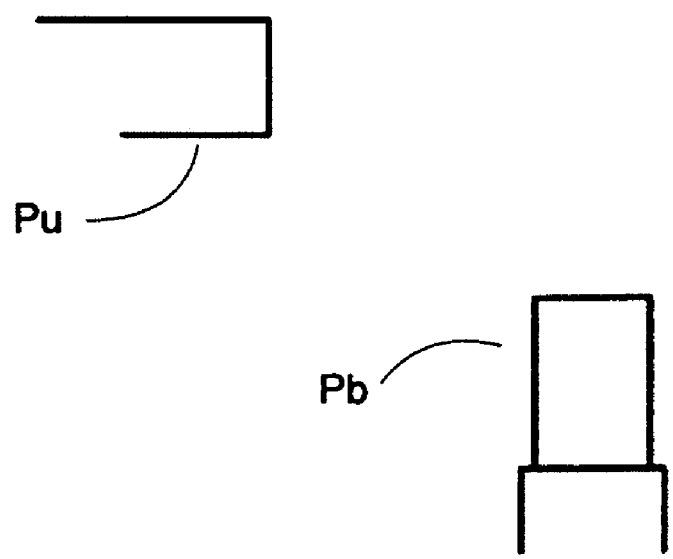
Figure 1D:
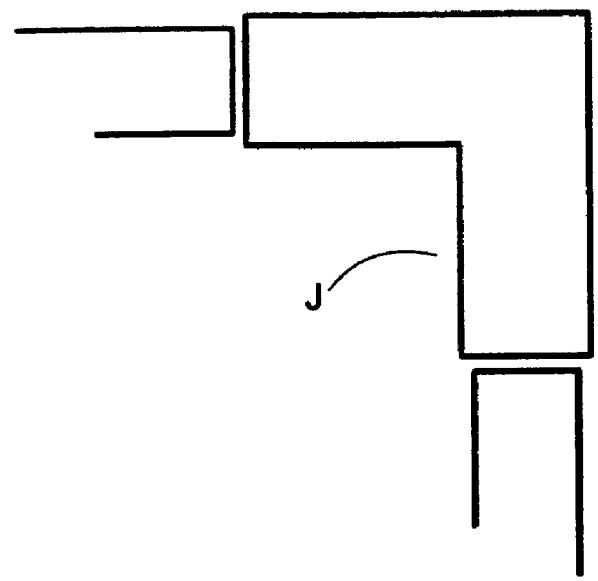
Figure 1E:
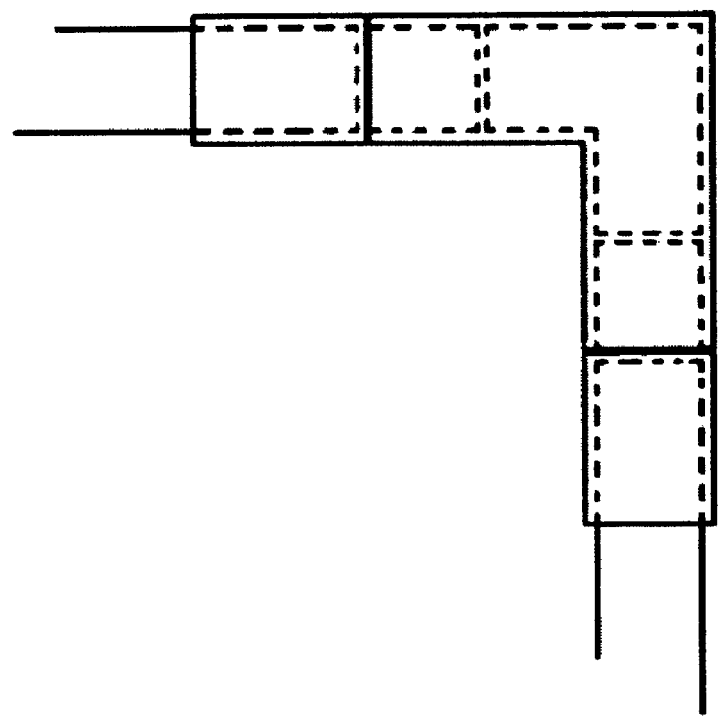
Figure 5:
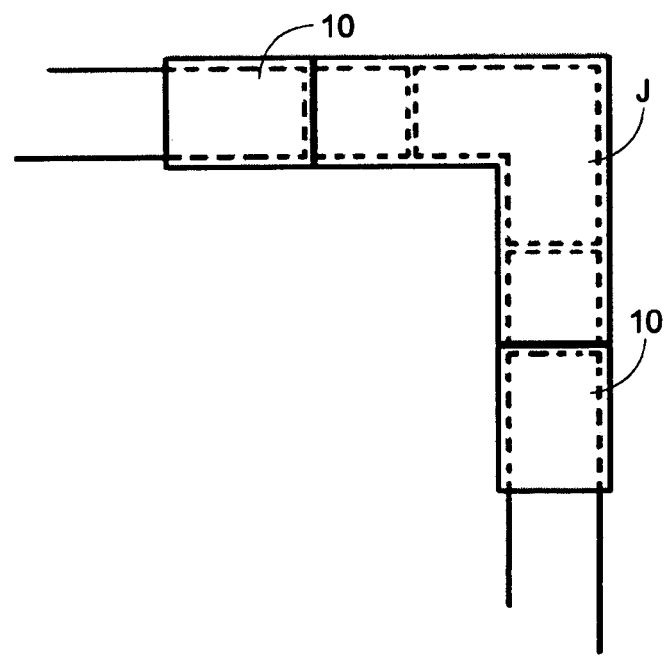
FIG. 5 is a cutaway view of an new junction J sleeved at either end of the junction with Applicant's novel sleeve.

Applicant's method of replacing a broken or cracked PVC pipe where such a break or crack is at or near the point where the pipe enters the junction (such an "L" or "T" shaped junction) includes the following:

a). Cut back the broken pipe FIG. 1C;
b). Cut back the unbroken pipe that is entering the same junction FIG. 1B;
c). Provide a new junction, typically same dimensions as old junction FIG. 1D;
d). Fully glue and seat at least two new sleeves with male ends into the new junction FIG. 1E;
e). Add additional extension sleeves if necessary FIGS. 4 and 5A; and
f). Seat and glue broken and unbroken cut back pipes in female end of the sleeves FIGS. 1E and 5.

Note that the inner surface of female end 12 of the sleeve may be tapered slightly (see FIG. 3).

The following represents the dimensions set forth in FIG. 3:

10A) Outside diameter of male end 14;
10B) Inside diameter of male end 14;
10C) Shoulder between male end and female end;
10D) Outside diameter of female end;
10E) Inside diameter of female end at its widest point;
10F) Inside diameter female end at its narrowest point;

-continued

10G) Length of male end (measured outside);
10H) Length of female end (measured inside);
10I) Total length of sleeve;
10J) Distance between outer shoulder and inner shoulder between male and female ends.

The table below provides representative preferred sizes for some of the dimensions set forth above for various size PVC pipe from ½ to 2 inches.

| SIZE | 10A | 10E | 10F | 10G Preferred Range | 10H | 10I | 10J |
|---|---|---|---|---|---|---|---|
| ½ | 0.84 | 0.852 | 0.832 | 0.875–4 | 0.875 | 2.0625 | 0.25 |
| ¾ | 1.05 | 1.062 | 1.042 | 1–4 | 1 | 2.2813 | 0.2813 |
| 1 | 1.315 | 1.33 | 1.305 | 1.125–4 | 1.125 | 2.5314 | 0.25 |
| 1¼ | 1.66 | 1.675 | 1.65 | 1.25–4 | 1.25 | 2.8125 | 0.2813 |
| 1½ | 1.9 | 1.918 | 1.888 | 1.375–4 | 1.375 | 3.0625 | 0.2813 |
| 2 | 2.375 | 2.393 | 2.368 | 1.5–4 | 1.5 | 3.3125 | 0.25 |

FIGS. 1A–1E illustrate the use of Applicant's novel sleeve and Applicant's novel method to replace a broken pipe Pb, which crack is adjacent a junction, where the other end of the junction typically has an unbroken pipe Pu entering therein. Where it may require more than one sleeve to reach the cut back section of broken pipe Pb to the new junction, the unbroken pipe is simply cut back sufficient distance to allow a single sleeve to reach the new junction, see FIG. 4. Thus, in the method illustrated in FIG. 4, a total of three sleeves are used and therefore, five glue joints.

Figure 5A:
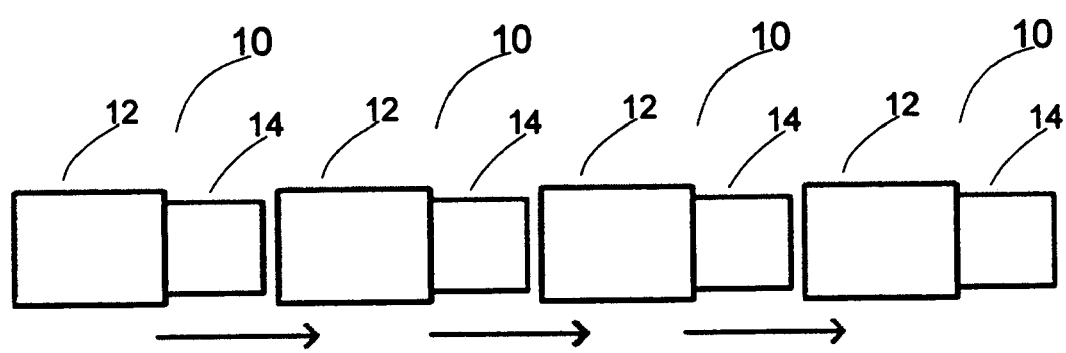
FIG. 5A shows a multiplicity of sleeves used to reach a new junction.

FIG. 5A shows a method of using a multiplicity of sleeves to reach a new junction. It is noted that the sleeves, which telescope male end into the female end, may not sit fully into the shoulder and thus there is some adjustability allowed in the lap distances of one sleeve into the other and of the female end on to the broken pipe (thus cut back) and the male end in to the new joint.

Solvent is applied to pipe joint and sleeve as is known in the art. After the new joint and sleeves are in place and before the solvent sets, the sleeve or sleeves may be adjusted so that overlap and inlap is sufficient such that, once the solvent sets, the repairs are sufficiently strong. The amount of adjustment for inlap and overlap would be known to those skilled in the art.

Applicant also provides a kit, the kit comprising a junction and a multiplicity of similarly dimensioned sleeves. For example, a kit could be provided with an elbow junction or a t-shaped junction. The kit would include a multiplicity of sleeves. Each sleeve of the multiplicity of similarly dimensioned sleeves would have a female with an inner diameter approximately equal to or just slightly larger than the outer diameter of the male end of the sleeve.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A method of repairing a broken pipe entering a first junction, the first junction having an unbroken pipe entering the junction, the method comprising the steps of:

providing a multiplicity of similarly dimensioned sleeves, each with a female end and a male end, the male end with an outer diameter equal to the inner diameter of the first junction and the female end having an inner diameter equal to the outer diameter of the pipe, wherein the male end outer diameter is substantially equal to the female end inner diameter such that the male end of one sleeve may be inserted snugly into the female end of another sleeve;

providing a second junction having dimensions substantially similar to the first junction;

identifying the location of the break;

making a first cut of the broken pipe such that the break is between the first cut and the first junction;

making a second cut of unbroken pipe such that the cut allows the removal of the first junction;

inserting at least one male member of a sleeve into one end of the second junction and at least one male member of another sleeve into a second end of the second junction such that a sleeved junction is created that has female ends thereof;

attaching female ends of the sleeved junction to respectively overlap the first cut pipe and overlap the second cut pipe.

2. The method of claim 1 wherein the insert step includes a step of adding at least two sleeves to one end of the second junction.

3. The method of claim 1 wherein the insert step includes adding only a single sleeve to the first end of the second junction and only a single sleeve to the second end of the second junction.

4. The method of claim 1 wherein the second junction is an elbow having an angle greater than 0° and up to and including 90°.

5. The method of claim 1 wherein the second junction is a "T."

6. The method of claim 1 wherein the second junction is a cross.

7. The method of claim 1 wherein the multiplicity of sleeves come from one of the following group of sleeves, each group with the following female end inner diameters/male end outer diameters in inches: 0.852/0.84; 1.062/1.05; 1.33/1.315; 1.675/1.66; 1.918/1.9; 2.393/2.375.

8. The method of claim 1 wherein the first cut of the making step is made adjacent the break.

9. The method of claim 1 wherein the second cut of the making step is made at a distance from a point where the unbroken pipe enters the first junction, such distance being less than a length of a sleeve of the multiplicity of similarly dimensioned sleeves.

10. The method of claim 1 wherein, after the attaching step the step of adjusting takes place, the step of adjusting being the step of adjusting the overlap for optimal strength.

\* \* \* \* \*